United States Patent
Kamifuji et al.

(10) Patent No.: US 8,815,426 B2
(45) Date of Patent: Aug. 26, 2014

(54) PRISMATIC SEALED SECONDARY CELL AND METHOD OF MANUFACTURING THE SAME

(75) Inventors: Taiki Kamifuji, Tokushima (JP);
Takenori Kimura, Naruto (JP);
Kousuke Yamamoto, Kasai (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 633 days.

(21) Appl. No.: 13/024,837

(22) Filed: Feb. 10, 2011

(65) Prior Publication Data
US 2011/0195287 A1 Aug. 11, 2011

(30) Foreign Application Priority Data
Feb. 10, 2010 (JP) ................................. 2010-027989

(51) Int. Cl.
*H01M 2/26* (2006.01)
*H01M 4/04* (2006.01)
*H01M 10/36* (2010.01)

(52) U.S. Cl.
USPC ............ 429/94; 429/211; 29/623.1; 29/623.5

(58) Field of Classification Search
USPC .......................... 429/94, 211; 29/623.1, 623.5
See application file for complete search history.

(56) References Cited

U.S. PATENT DOCUMENTS

| | | | |
|---|---|---|---|
| 5,155,320 A | 10/1992 | Simmons | |
| 6,027,831 A | 2/2000 | Inoue et al. | |
| 6,515,449 B1 | 2/2003 | Thomas et al. | |
| 8,460,811 B2 * | 6/2013 | Hattori et al. | 429/94 |
| 2001/0021471 A1 | 9/2001 | Xing et al. | |
| 2002/0146620 A1 | 10/2002 | Connell | |
| 2005/0287431 A1 * | 12/2005 | Cho | 429/161 |
| 2007/0105015 A1 | 5/2007 | Munenaga et al. | |

(Continued)

FOREIGN PATENT DOCUMENTS

| | | |
|---|---|---|
| CN | 101536180 A | 9/2009 |
| JP | 58-113268 U | 8/1983 |

(Continued)

OTHER PUBLICATIONS

Office Action dated Aug. 27, 2012, issued in related U.S. Appl. No. 13/218,697.

(Continued)

*Primary Examiner* — Milton I Cano
*Assistant Examiner* — Lilia V Nedialkova
(74) *Attorney, Agent, or Firm* — Westerman, Hattori, Daniels & Adrian, LLP

(57) ABSTRACT

A prismatic sealed secondary cell that is excellent in current collection efficiency and current collection stability, and capable of high output discharge. In the prismatic sealed secondary cell a laminate-type or a wound laminate-type flat electrode assembly is housed in a prismatic cell case, a pair of current collector plates are disposed on a flat portion of the outermost surface of the core exposed portion of the first electrode plate constituting the flat electrode assembly so that the pair of current collector plates sandwich the flat portion in the thickness direction, and a columnar connection conductive member is interposed between two-divided core exposed portion laminates in the flat portion sandwiched between the pair of current collector plates, and the pair of current collector plates, the columnar connection conductive member and the two-divided core exposed portion laminates are welded to each other.

14 Claims, 13 Drawing Sheets

(56) References Cited

U.S. PATENT DOCUMENTS

| | | | |
|---|---|---|---|
| 2007/0117009 A1* | 5/2007 | Yamauchi et al. | 429/160 |
| 2009/0004561 A1 | 1/2009 | Nansaka et al. | |
| 2009/0004562 A1 | 1/2009 | Inagaki et al. | |
| 2009/0087735 A1 | 4/2009 | Yoon et al. | |
| 2009/0092860 A1* | 4/2009 | Yamamoto et al. | 429/7 |
| 2009/0104525 A1 | 4/2009 | Nakagawa et al. | |
| 2010/0006315 A1 | 1/2010 | Kumatani et al. | |
| 2010/0287763 A1 | 11/2010 | Tsuchiya et al. | |
| 2012/0028088 A1* | 2/2012 | Hattori et al. | 429/53 |

FOREIGN PATENT DOCUMENTS

| | | |
|---|---|---|
| JP | 2000-040501 A | 2/2000 |
| JP | 2001-257002 A | 9/2001 |
| JP | 2003-249423 A | 9/2003 |
| JP | 2005-216825 A | 8/2005 |
| JP | 2006-228551 A | 8/2006 |
| JP | 2009-176482 A | 8/2009 |

OTHER PUBLICATIONS

Search Report dated Feb. 29, 2012, issued in related European Application No. 11173780.5.

Office Action dated Mar. 21, 2013, issued in related U.S. Appl. No. 12/878,479.

U.S. Non-Final Office Action dated Nov. 25, 2013, issued in related U.S. Appl. No. 13/181,793 (24 pages).

* cited by examiner (a)

(b)

30

(a)

(b)

33

(a)

(b)

PRISMATIC SEALED SECONDARY CELL AND METHOD OF MANUFACTURING THE SAME

BACKGROUND OF THE INVENTION

1. Field of the Invention

The present invention relates to a current collector system structure to increase stability in current collection of a prismatic sealed secondary cell.

2. Background Art

In recent years, a cell-powered car using a secondary cell as a power source, such as an electric vehicle (EV) and a hybrid electric vehicle (HEV), has been becoming popular. However, a high power secondary cell is required for such a cell-powered vehicle. In addition, since sophistication of mobile electronic devices such as mobile phones and laptop computers is developing, higher output of cells is also required in these applications.

To obtain high output from a cell, it is necessary to increase a facing area between positive and negative electrodes of the cell. The facing area between the electrodes can be increased using a laminated electrode assembly in which a number of positive and negative electrode plates are laminated or a spiral electrode assembly in which long positive and negative electrode plates are wound via a separator. Therefore, these electrode assemblies tend to provide a high power battery.

The secondary cell using the laminate electrode assembly or the spiral electrode assembly adopts a configuration in which a current collector plate is welded to a core exposed portion where a core of the positive and negative electrodes is exposed, and this current collector plate is connected to an external output terminal. In the high-power battery, it is important to stably take out high current. For the purpose of taking out a stable high current, it is advantageous to extend a contact area between the current collector plate and the positive and negative electrode cores to increase welded points. Thus, it is carried out to use a current collector plate wider than ever before in order to increase welded points between the current collector plate and the positive and negative electrode cores.

However, in a laminate-type high capacity secondary cell having a large number of windings or layers, it is not easy to extend a contact area between the current collector plate and the positive and negative electrode cores relative to the gross area of the electrode plates. Even if a wide current collector plate is used, high current cannot be taken out.

Regarding techniques for reducing the electrical resistance in the current collector system, a variety of current collecting structures have ever been proposed. For example, techniques in the following patent documents 1 to 4 are proposed.

PRIOR ART DOCUMENTS

Patent Documents

[Patent Document 1]
Japan Patent Application Publication No. 2003-249423 (Abstract)
[Patent Document 2]
Japan Utility Model application publication No. S58-113268 (Claims)
[Patent Document 3]
Japan Patent Application Publication No. 2000-40501 (FIG. 7)
[Patent Document 4]
Japan Patent Application Publication No. 2001-257002
[Patent Document 5]
Japan Patent Application Publication No. 2006-228551

Patent Document 1 discloses the following technique. A core laminated on both sides in the thickness direction of a flat wound electrode assembly is divided into two and combined respectively. Then, a U-shaped current collector is interposed between the divided flat wound electrode assemblies (an inner circumference of the winding), and electrical current is collected via the U-shaped member. In addition, the documents describes that this technique can enhance ability per unit volume of the cell because there can be decreased the width of a wound part protruding from the separator (a part for connection to the current collector terminal).

Patent Document 2 discloses a electrode lug terminal assembly device, in which a group of electrode lugs is divided into two groups, then each of the groups of electrode lugs is bound and integrally welded together with a plate disposed outside of the electrode lugs to a side lower surface of a electrode bar. And it discloses that this technique allows to form a short current path and to increase a connection area.

Patent Document 3 discloses a structure as follows: a rectangular plate-like current collector terminal connection (a part of an electrode terminal) is inserted into the middle part in the thickness direction of an electrode assembly formed by collecting electrode cores; and thereby electrical current is collected via the current collector terminal connection. It is also described that there can be provided a wound electrode cell that can withstand high current because the above structure can decrease connection resistance.

Patent Documents 4 and 5 also disclose a current collector structure that can reduce an internal resistance.

BRIEF SUMMARY OF THE INVENTION

The object of the present invention is to devise a current collector system structure that can enhance efficiency and stability of current collection in a high capacity prismatic sealed secondary cell having a large number of laminates and windings, and to provide the prismatic sealed secondary cell from which high output can be stably taken out.

The first invention of the prismatic sealed secondary cell to solve the above problems is featured as follows.

The prismatic sealed secondary cell includes: a flat electrode assembly in which a first electrode plate and a second electrode plate having a different polarity from that of the first electrode plate, both of which respectively have a core exposed portion at one edge thereof in the width direction, are laminated or spirally wound with a separator interposed therebetween so that the respective core exposed portions may point in the laterally opposite directions; a current collector plate joined to the first electrode plate; an external output terminal electrically connected to the first electrode plate via the current collector plate; and a prismatic cell case housing the flat electrode assembly, wherein a pair of current collector plates are disposed on a flat portion in the outermost surface of the core exposed portion of the first electrode plate constituting the flat electrode assembly so that the pair of current collector plates sandwich the flat portion in the thickness direction, a columnar connection conductive member is interposed between two-divided core exposed portion laminates in the flat portion sandwiched between the pair of current collector plates, and the pair of current collector plates, the columnar connection conductive member and the two-divided core exposed portion laminates are welded to each other.

In order to achieve high energy density and high capacity of the prismatic sealed secondary cell, it is required to use a thin electrode core, to make this core hold an active material as much as possible, and to laminate or wind the electrode plate thus prepared so as to form a multilayer. However, because a thin electrode core may be easily broken and result in an electrical resistance increase, it becomes difficult to stably collect high electrical current.

The present invention targets a prismatic sealed secondary cell formed by that a flat electrode assembly in which a first electrode plate and a second electrode plate are laminated or wound is housed in a prismatic cell case. A core exposed portion in the first electrode of the flat electrode assembly is exposed to one edge side of the flat electrode assembly, and a core exposed portion in the second electrode is exposed to the other edge side of the flat electrode assembly.

In the cell having this structure, the present invention adopts the following configuration. Each of a pair of current collector plates is disposed on one edge of the flat core exposed portion of a first electrode in the flat portion of the flat electrode assembly so that the pair of current collector plates sandwich the edge in the thickness direction. And a conductive member is interposed in the middle of the core exposed portion laminate (between the two-divided core exposed portion laminates). Then, each of the pair of current collector plates, the columnar connection conductive member and the two-divided core exposed portion laminates are welded.

When the exposed core portion laminate is divided into two groups and the connection conductive member is interposed between the two-divided core exposed portion laminates, the two-divided core exposed portion laminates can be electrically connected with just one welding process. Thereby, the welding workability is highly improved compared with a system of welding respective members.

In addition, when the connection conductive member is interposed between the two-divided core exposed portion laminates, a quality welding can be performed efficiently compared with when the whole of the exposed core portion laminate is welded at one time.

In order to directly weld a non-divided core exposed portion laminate in the thickness direction of the flat electrode assembly, the core exposed portion laminate must be welded while pressed in the thickness direction center of the flat electrode assembly. Thereby, a significant distortion occurs in the electrode assembly, and wrinkles and shrinkage occurs in the electrode core during a process of melting and cooling. Thus, there is formed a flat electrode assembly having underlying stress. In contrast, a structure in which the connection conductive member is interposed between two-divided core exposure portion laminates provides a welding with less underlying stress. Therefore, a flat electrode assembly excellent in shape stability can be formed.

Moreover, compared to welding a non-divided core exposed portion laminate in the thickness direction of the flat electrode assembly, it is possible to reduce the width of the core exposed portion of each electrode plate.

Therefore, according to the above structure, there can be achieved a collector system that can stably collect and output a large electric current. Such an invention, i.e. the present invention, is useful, especially in a high capacity prismatic sealed secondary cell having a large number of laminate layers or windings.

Herein, the "electrode plate" in the above configuration means one in which an active material layer is formed on an electrode core. A "first electrode plate" means either a positive or negative electrode. And a "second electrode plate" means the electrode opposite to the first electrode plate. In addition, a "laminate" means that the first and second electrode plates laminated in sequence with a separator interposed therebetween. A "wound laminate" means the first and second electrode plates spirally wound with a separator interposed therebetween. In the "wound laminate", the electrodes are wound and laminated outward from the center of winding.

The term "two-divided" just means a division from one piece to two pieces, but does not mean to divide into two equal parts. However, a division into two roughly equal parts is preferred. In the case of "a wound laminate", it is preferable to divide the laminate with the central axis of the winding as a boundary.

The term "columnar" in the "columnar connection conductive members" means a ratio $H/R>1$ wherein R and H are the diameter and the height of the connection conductive member, respectively. The ratio $H/R$ is preferably more than 1 and 5 or less, and more preferably in the range of 2 to 3. In the case of a connection conductive member having a non-circular shaped cross section, R is a diameter of a circumscribed circle surrounding the cross-sectional shape. When the connection conductive member has an uneven thickness, the diameter is defined as a value obtained by dividing the total of cross-sectional diameters of the thickest part and the thinnest part by two (the average).

In the configuration of the above prismatic sealed secondary cell, a convex curve may be formed at each of both ends of the columnar connection conductive member, which are contacted with the core exposed portion.

When each of both ends of the columnar connection conductive member may have a convex curve, the convex curve can ensure a contact between the current collector plate and a laminated surface of the core exposed portion during the pressing step. In addition, since the convex curve serves as a concentrated point of resistance welding current, resistance welding can be efficiently performed.

In the above prismatic sealed secondary cell, there is adopted the configuration in which the first electrode plate is "electrically connected" to the external output terminal via the current collector plate. The phrase "electrically connected" includes both a case where the current collector plate is directly connected to the external output terminal and a case where the current collector plate is electrically connected to the external output terminal with a lead or a current interrupter interposed therebetween.

In the structure of the prismatic sealed secondary cell, a recess may be formed at each of both ends of the columnar connection conductive member, which are contacted with the core exposed portion.

When the columnar connection conductive member has a recess formed in the center of the ends thereof, as compared with the convex end, the contact with the core exposure portion is more stable. Therefore, misalignment hardly occurs during the time after the arrangement of the connection conductive member between the two-divided core exposed portion laminates until the welding. In addition, since the inside of the recess does not contact the core exposed portion, electric current flows through an edge of the recess into the center of the recess. Thus, compared with the case of the flat tip of the connection conductive member, a degree of current concentration is large, and welding current is concentrated to the axis center of the connection conductive member. Thereby, temperature of the part to be welded effectively increases. In a word, this configuration provides both excellent resistance welding and workability.

In the structure of the above prismatic sealed secondary cell, the columnar connection conductive member may be tubular.

A tubular connection conductive member is almost similar to the columnar connection conductive member having recesses formed in the center of both ends thereof, and therefore the similar effects can be obtained. In addition, the tubular member allows a reduction in weight and thus an increase in energy density of the cell, as compared with a solid columnar connection conductive member.

In the configuration using the tubular connection conductive member or the columnar connection conductive member having a recess formed in the center of both ends thereof, there can be used a current collector plate having a protrusion on the surface thereof that corresponds to the recess formed at the end of the connection conductive member.

In this configuration, the following are arranged in alignment: the protrusions provided on the surface of each of a pair of the current collector plate (each of the protrusions protrudes toward the end of the connection conductive member.); recessed ends of the connection conductive member or the hollow part of the tubular member (which also serves as a recessed end); and the axis of the columnar connection conductive member. In this configuration, when pressing both of the current collector plates that are placed on each outermost layer of the core exposed portion laminates, a part of the core exposed portion, which is contacted with the protrusion provided on the surface of the current collector plate, is pressed more strongly, leading to a bulge of the inner surface of the core exposed portion laminate. This bulge is somewhat fitted to the recess or the hollow of the connection conductive member to fix both ends thereof. Thereby, resistance welding with high stability and workability can be performed. As a result, there can be obtained a prismatic sealed secondary cell that is excellent in the high current collecting performance.

In the prismatic sealed secondary cell having each of the above configurations, a circumference of the columnar connection conductive member may be further covered with a resin reinforcing member.

The columnar connection conductive member is a member to ensure conductivity between the two-divided core exposed portion laminates. When the connection conductive member is columnar, since the contact area with the core is small, welding current can be easily concentrated even without forming a protrusion. Thus, in terms of the concentration of welding current, a thin (small diameter) columnar connection conductive member is preferred. However, a thin columnar connection conductive member is unstable against pressure when pressed with the resistance welding electrode bar in the vertical direction, which may easily lead to a poor welding. In addition, a thin columnar connection conductive member may deform due to the pressing force.

On the other hand, in the above structure in which a resin reinforcing member is provided around the columnar connection conductive member, the resin reinforcing member reinforces the connection conductive member, and therefore the deformation of the connection conductive member is prevented. The connection conductive member becomes apparently thick because of the resin reinforcing member provided around the connection conductive member, and therefore the connection conductive member can be easily disposed in the two-division boundary. In addition, since the resin reinforcing member generally has less weight per volume than the connection conductive member, a decrease in weight energy density of the cell can be suppressed compared with when the connection conductive member itself is made thicker. When the resin reinforcing member is insulative, an unnecessary contact between the connection conductive member and the electrode plate can be prevented.

In view of the above, the configuration using the resin reinforcing member realizes a prismatic sealed secondary cell that is applicable to high current discharge and excellent in reliability and stability.

Preferably, the resin reinforcing member does not cover the vicinity of both ends of the columnar connection conductive member because the both ends are a part to receive welding current and to be melted. Specifically, when the heights of the resin reinforcing member and the columnar connection conductive member are respectively defined as H1 and H2, [H1/H2] is set to [1/3 to 1/1], and preferably [1/2 to 10/11], and the longitudinal center of the columnar connection conductive member is matched with that of the resin reinforcing member. Thereby, the resin reinforcing member covers the columnar connection conductive member except for the both ends and the vicinity thereof.

As long as the resin reinforcing member provides a reinforcing function, its size and shape are not particularly limited. However, when the diameter of the columnar connection conductive member is defined as R and the thickness of the resin reinforcing member (thickness covering the columnar connection conductive member) is defined as W, "W/R" is preferably ⅓ or more. Regarding this "W/R", an area center may be determined in a cross section resulting from cutting the resin reinforcing member-attached columnar connection conductive member in the direction perpendicular to the longitudinal direction, and thereby "R" and "W" may be determined in radial directions from the area center.

In the prismatic sealed secondary cell according to each of the configurations described above, each of the pair of the current collector plates can be further electrically connected to the external output terminal.

A current collector plate is attached on each of the outermost surfaces of the core exposed portion laminates constituting the edge of the flat electrode assembly according to the present invention, and the flat portion is sandwiched between the at least two current collector plates. In this structure, when each of the pair of the current collector plates is electrically connected to the external output terminal, an electrical load of the electrical conductive path from the current collector plate to the external output terminal can be halved, and therefore current collecting resistance of the cell is further reduced.

In the prismatic sealed secondary cell having each of the above configuration, the flat electrode assembly can be configured as a spiral flat electrode assembly formed by winding a first electrode plate and a second electrode plate via a separator and processing it into a flat shape.

A spiral flat electrode assembly formed by processing a spiral electrode assembly into a flat shape is preferred because a cell with high productivity and excellent volume energy density can be produced by increasing the number of winding. However, a large number of windings increase current collecting resistance. In response, when the flat portion is divided into two and they are connected via a columnar connection conductive member, the current collecting resistance can be significantly reduced. Therefore, the effects of the present invention are more markedly exerted in a prismatic sealed secondary cell having a spiral flat electrode assembly.

Next, there is described below a preferred manufacturing method for producing the prismatic sealed secondary cell of the present invention described above.

The manufacturing method of the prismatic sealed secondary cell according to the present invention is a method for producing a prismatic sealed secondary cell comprising at least: a flat electrode assembly in which a first electrode plate and a second electrode plate having a different polarity from that of the first electrode plate, both of which respectively have a core exposed portion at one edge thereof in the width direction, are laminated or spirally wound with a separator interposed therebetween so that the respective core exposed portions may point in the laterally opposite directions; a current collector plate joined to the first electrode plate; an external output terminal is electrically connected to the first electrode plate via the current collector plate; and a prismatic cell case housing the flat electrode assembly. The manufacturing method comprises: a first step of dividing a flat portion of a core exposed portion laminate formed by laminating the core exposed portion of the first electrode plate into two parts in the thickness direction, and of interposing a columnar connection conductive member therebetween; a second step of disposing a current collector plate on both outermost surfaces of the flat portion of the core exposed portion laminate formed by laminating the core exposed portion of the first electrode plate; and a third step of contacting a resistance welding rod on the respective current collector plates with the columnar connection conductive member interposed after completing the first and second steps, and of welding the current collector plate, the columnar connection conductive member and the two-divided core exposed portion laminates due to voltage application.

It is not required to consider the order of the first and second steps. Thus, either of these steps may be performed first.

The manufacturing method described above allows to efficiently produce a prismatic sealed secondary cell applicable to high current discharge.

In the manufacturing method described above, a tubular member can be used as the columnar connection conductive member.

In addition, a member whose both ends are recessed can be used as the columnar connection conductive member.

Also, a member whose both ends have a convex curve can be used as the columnar connection conductive member.

Also, there can be used a current collector plate in which a protrusion is formed at the site therein opposite to the end of the columnar connection conductive member.

Also, a member whose circumference is covered with a resin reinforcing member can be used as the columnar connection conductive member.

Moreover, as the flat electrode assembly, there can be used a spiral flat electrode assembly formed by flattening a spiral electrode assembly in which a first electrode plate and a second electrode plat are wound via a separator.

As mentioned above, according to the invention, there can be provided a prismatic sealed secondary cell that is capable of high power discharge and excellent in efficiency and stability of the current collection.

DETAILED DESCRIPTION OF THE INVENTION

Embodiment 1

Figure 1:
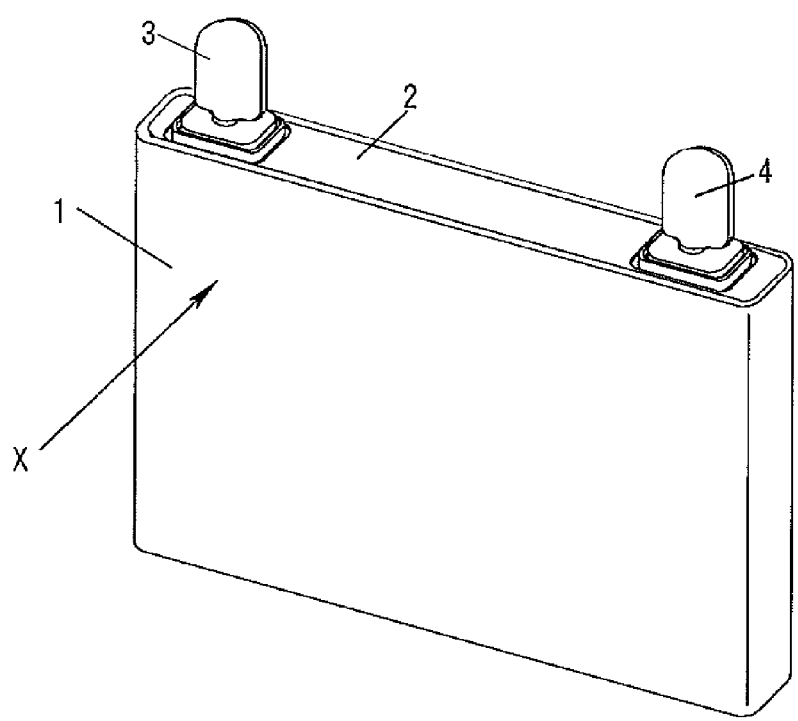
FIG. 1 is a perspective view showing the appearance of a prismatic sealed secondary cell according to Embodiment 1.

An Embodiment for carrying out the present invention will be explained using as an example of a lithium ion secondary cell using a spiral flat electrode assembly. FIG. 1 is a perspective view showing the appearance of a lithium ion secondary cell (prismatic sealed secondary cell) using a spiral flat electrode assembly. As shown in FIG. 1, the lithium ion secondary cell according to Embodiment 1 comprises a prismatic cell case 1, a sealing plate 2 for sealing an opening of the prismatic cell case 1, and positive and negative electrode external output terminals 3 and 4 outwardly protruding from the sealing plate 2. In addition, a spiral flat electrode assembly 10 as a main component is housed in the prismatic cell case 1.

Figure 2:
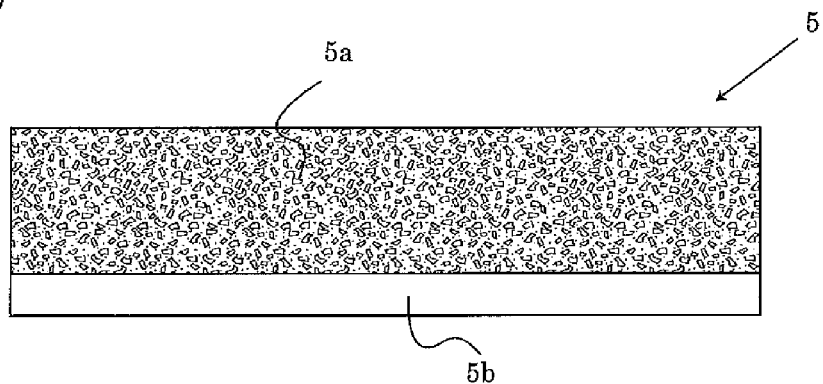
FIG. 2 shows a front view showing positive and negative electrode plates according to Embodiment 1.
Figure 2:
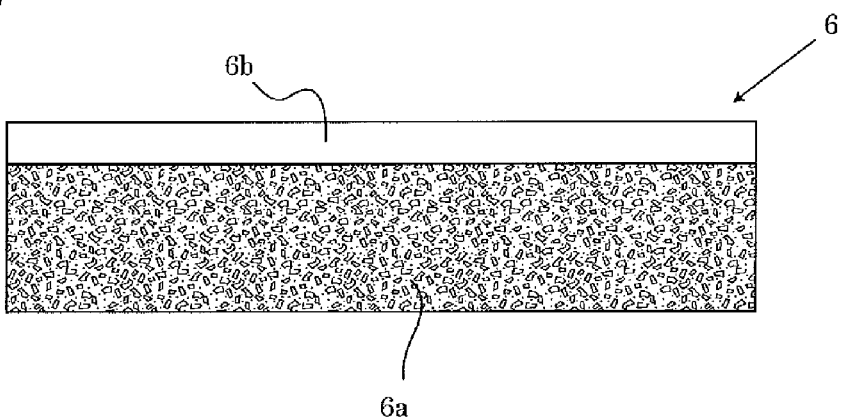

FIG. 2 shows a front view schematically depicting the positive and negative electrode plates used in the lithium ion secondary cell according to Embodiment 1. In this drawing, FIG. 2(a) shows a positive electrode plate 5, and FIG. 2(b) shows a negative electrode plate 6. Either of the positive or negative electrode plate may be defined as a first electrode plate. In both of the positive and negative electrode plates, each active material is applied on both front and back surfaces of each strip electrode core except for one end along the longitudinal direction. The region 5a and 6a where the active material is applied serves as an electric generation surface. And the region where the active material is not applied is the core exposed portion 5b and 6b, from which electric current is collected.

The positive and negative electrode plate are laminated and spirally wound with a separator interposed therebetween so that the core exposed portions 5b and 6b may point in the laterally opposite directions, thus forming the flat electrode assembly 10. In the spiral flat electrode assembly 10 thus fabricated, the positive electrode core exposed portion is positioned on one edge side, and the negative electrode core exposed portion is positioned on the other edge side.

The details of the fabrication of a lithium ion secondary cell as the prismatic sealed secondary cell according to Embodiment 1 is sequentially described below with reference to the drawings. However, the invention should not be limited to the fabrication method shown below.

<Preparation of Positive Electrode Plates>

A positive electrode active material of lithium cobalt oxide ($LiCoO_2$), a carbonaceous conductive agent such as acetylene black and graphite, and a binder of polyvinylidene fluoride (PVDF) are weighed at a mass ratio of 90:5:5. Then, these are dissolved in an organic solvent such as N-methyl-2-pyrrolidone and mixed to prepare a positive electrode active material slurry.

Next, using a die coater, a doctor blade or the like, the positive electrode active material slurry is applied in a uniform thickness on both sides of a positive electrode core made of a strip-like wide aluminum foil with 7.5 μm thick and 10000 m length, thus forming a positive electrode active material layer 5a. However, the slurry is not applied at one end (an end in the same side on both surfaces) along the longitudinal direction of the positive electrode core so that the core may be partially exposed to form a positive electrode core exposed portion 5b.

Then, this plate is passed through the dryer to remove the organic solvent, thus preparing the dried plate. This dried plate is rolled to a thickness of 0.06 mm using a rolling press to prepare a positive electrode base plate. This positive electrode base plate is cut to a strip with a width of 100 mm to prepare a positive electrode plate 5 (FIG. 2(a)). The width and length of this positive electrode plate 5 are 100 mm and 6000 mm, respectively. In this plate, the width of the positive electrode core exposed portion is 10 mm.

<Preparation of the Negative Electrode Plate>

A negative electrode active material of artificial graphite with a volume average particle size of 20 μm, a binder of a styrene-butadiene rubber, and a thickening agent of carboxymethylcellulose are weighed in a mass ratio of 98:1:1. Then, these are mixed with an appropriate amount of water to prepare a negative electrode active material slurry.

Next, using a die coater, a doctor blade or the like, the negative electrode active material slurry is applied in a uniform thickness on both sides of a negative electrode core made of a strip-like wide copper foil with 12 μm thick and 10000 m length, thus forming the negative electrode active material layer 6a. However, the slurry is not applied at one end (an end in the same side on both surfaces) along the longitudinal direction of the negative electrode core, and thus the core is partially exposed to form a negative electrode core exposed portion 6b.

Then, this plate is processed in the similar way to the positive electrode plate, thus preparing a negative electrode base plate with a thickness of 0.05 mm in which an active material layer is formed. This negative electrode base plate is cut to a strip with a width of 110 mm to obtain a negative electrode plate 6 (FIG. 2(b)). The width and length of this negative electrode plate 6 are 110 mm and 6200 mm, respectively. In this plate, the width of the negative electrode core exposed portion is 8 mm.

The negative electrode active material is not limited to the above-mentioned artificial graphite. In addition to or instead of this, there can be also used a carbonaceous material such as natural graphite, carbon black, coke, glassy carbon, carbon fiber, and fired products thereof, or a mixture of the above carbonaceous material with at least one selected from the group consisting of lithium, lithium alloys, and metal oxides that can intercalate and deintercalate lithium.

<Preparation of a Flat Electrode Assembly>

The positive electrode plate, the negative electrode plate and a separator made of polyethylene microporous membrane (thickness 0.022 mm) are positioned and laminated so that a plural of core exposed portions of the same electrode are overlapped, the core exposed portion of one electrode protrudes toward the opposite side to that of the other electrode relative to the direction of winding, and the separator is always interposed between different active material layers. Then, this laminate is wound 44 times using a winder, and then an insulation tape is attached at the winding end. Thereafter, the wound member is pressed from the thickness direction into a flat shape to complete a spiral flat electrode assembly 10. A perspective view of this spiral flat electrode assembly 10 is shown in FIG. 3.

Figure 3:
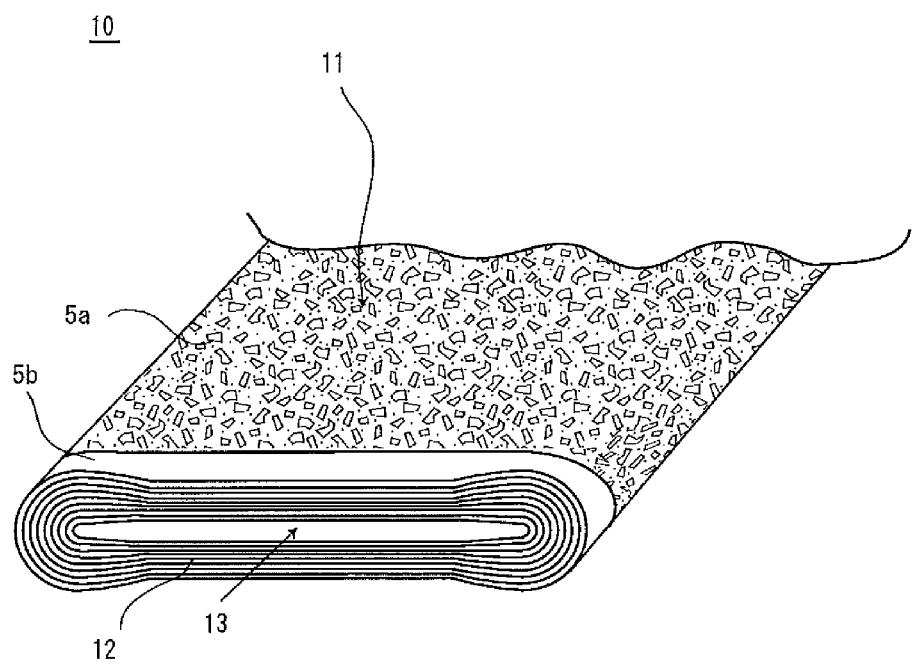
FIG. 3 shows a perspective view of a flat electrode assembly according to Embodiment 1.

Based on FIG. 3, the shape of the spiral flat electrode assembly 10 is explained. The spiral flat electrode assembly 10 is formed by winding the positive and negative electrode plates 44 times. In a planar view from the thickness direction, a positive electrode core exposed portion laminate 12 composed of a wound and laminated positive electrode core exposed portion 5b is formed at one end, and the negative electrode core exposed portion laminate (the back of FIG. 3) composed of the wound and laminated negative electrode core exposed portion 6b is formed at the other end. Moreover, in the center region (the region except both curved edges) in the planar view from the thickness direction, a flat portion 11 is formed.

The numerical reference 13 in FIG. 3 indicates a region formed by division of the positive electrode core exposed portion laminate 12. This region is referred to as a two-division boundary. And each laminate formed by division of the positive electrode core exposed portion laminate is herein referred to as a divided positive electrode core exposed portion laminate (12').

In Embodiment 1, the whole thickness of the flat portion of the positive electrode core exposed portion laminate 12 is 660 μm (88 sheets of the positive electrode cores are laminated.), and each thickness of the divided positive electrode core exposed portion laminate (12') is 330 μm.

<Current Collector Plate Member>

Figure 4:
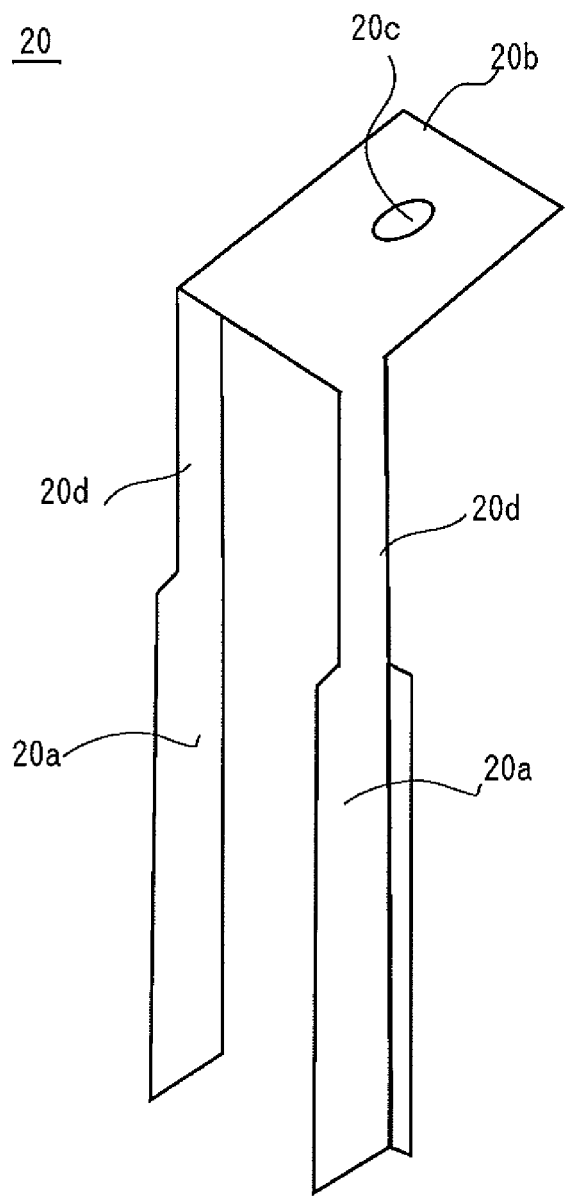
FIG. 4 shows a perspective view showing the shape of a current collector plate member according to Embodiment 1.

FIG. 4 shows the current collector plate member. This collector plate member 20 is prepared by bending a plate punched out from a 0.8 mm thick aluminum plate. There are integrally formed an external connection portion 20b having an attachment hole 20c, two lead portions 20d, 20d continued from the external connection portion 20b, and core contact portions 20a, 20a continued from the lead portions 20d, 20d. As shown in FIG. 4, the core contact portions 20a, 20a have a L-shaped cross section. The plate of the external connection portion 20b is formed perpendicular to the longitudinal direction of the core contact portions 20a.

In the current collector plate member 20 in FIG. 4, the core contact portions 20a, 20a correspond to a narrow-defined current collector plate. The present invention requires a current collector plate to directly contact the core exposed portion as an essential element, but a method for connecting the current collector plate and the external output terminal is not limited. Thus, the current collector plate member 20 is not limited to the shape shown in FIG. 4. Moreover, the core contact portions 20a, 20a shown in FIG. 4 are processed to an L-shape, but it is not necessary for the current collector plate to have such a shape. In addition, the current collector plate member 20 shown in FIG. 4 has two feet (the lead portions and the core contact portions), but one-foot type may be also used. For example, one current collector has a core contact portion and a lead portion that connects to an external connection portion, while the other current collector has only a core contact portion without a lead portion. However, the current collector plate member 20 having the shape shown in FIG. 4 is preferred because of excellent current collecting property and workability of the cell fabrication.

<Reinforcing Member-Attached Connection Conductive Member>

Figure 5:
FIG. 5 is a diagram showing a columnar connection conductive member according to Embodiment 1, (a) is a top view, and (b) is a front view.
Figure 5:
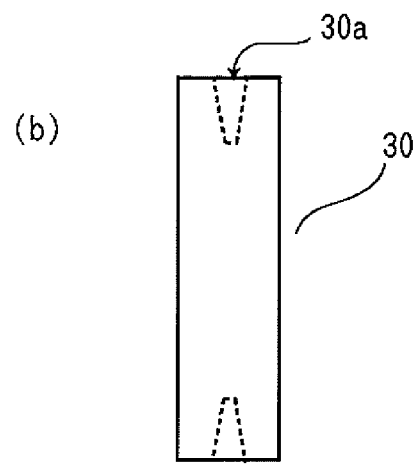

In Embodiment 1, a columnar connection conductive member whose circumference is covered with a resin reinforcing member is prepared. FIG. 5 (a) shows a plan view from above of the columnar connection conductive member, and FIG. 5 (b) shows its front view. In addition, FIG. 6 (a) shows a plan view of the conductive member whose circumference is covered with a resin reinforcing member, and FIG. 6 (b) shows its front view.

Figure 6:
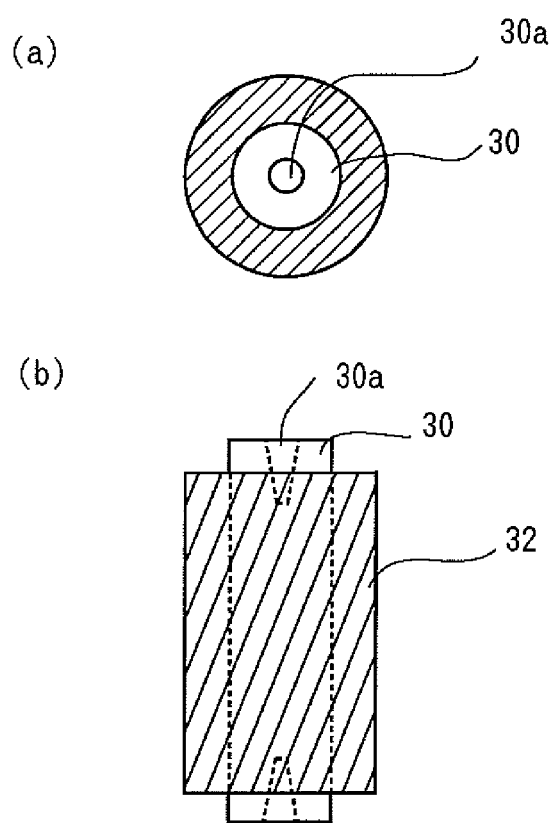
FIG. 6 is a diagram showing a columnar connection conductive member with a reinforcing member according to Embodiment 1, (a) is a top view, and (b) is a front view.

As shown in FIG. 5, this connection conductive member 30 is a columnar, and recesses are formed at both ends. As shown in FIG. 6, the connection conductive member 31 attached with the resin member has a configuration in which the connection conductive member 30 is fitted into the reinforcing member 32 whose height is less than that of the connection conductive member 30 so that both ends of the connection conductive member may protrude from the reinforcing member 32. The columnar connection conductive member 30 covered with the resin reinforcing member 32 is referred to as "a reinforcing member-attached connection conductive member".

The connection conductive member can be easily produced from a conductive material because of a simple shape. For example, this member may be formed from a conductive metal such as aluminum, copper, nickel, zinc and iron, and an alloy thereof. Preferably, the material of the connection conductive member is a metal material that excels in chemical stability against an electrolyte, charge/discharge resistance, and welding property with an electrode core. For example, a connection conductive member for a positive electrode of a lithium ion secondary cell is preferably made of aluminum or aluminum alloy, while the connection conductive member for a negative electrode is preferably made of copper, copper alloy or tough pitch copper.

On the other hand, it is preferable to use, as a resin reinforcing member, a resin that has excellent mechanical strength and hardly melts or softens due to heat of resistance welding. Moreover, a thermoplastic resin is preferred in terms of moldability, and a resin further having insulation is more preferable. Resins having such properties include, for example, polypropylene (PP), polyethylene (PE), polyvinylidene chloride (PVDC), polyacetal (POM), polyamide (PA), polycarbonate (PC), polyphenylene sulfide (PPS) and the like. Especially, PP and PE are preferably used because of low cost and stable supply.

The resin reinforcing member can be easily produced, for example, by injection molding using a thermoplastic resin. The injection molding process can simultaneously produce a hole into which a columnar connection conductive member is inserted, and can also produce a columnar connection conductive member integrated with a reinforcing member (a reinforcing member-integrated type columnar connection conductive member) by curing a resin around the columnar connection conductive member.

The sizes of the columnar connection conductive member and the resin reinforcing member in Embodiment 1 are as follows. The columnar diameter, the height, and the central recess diameter of the columnar connection conductive member are 3 mm, 12 mm and 1 mm, respectively. And the external diameter and the height of the resin reinforcing member are 6 mm and 10 mm, respectively. However, these sizes may be properly determined on the basis of the laminate thickness of the flat electrode assembly or a generation capacity.

<Electrolyte Solution>

Ethylene carbonate (EC), propylene carbonate (PC) and diethyl carbonate (DEC) are mixed in the volume ratio of 1:1:8 (1 atm and 25° C.), and then $LiPF_6$ is dissolved as an electrolyte salt in this mixed non-aqueous solvent at 1.0M (mol/l) to prepare an electrolyte solution.

<Cell Fabrication>

Figure 7:
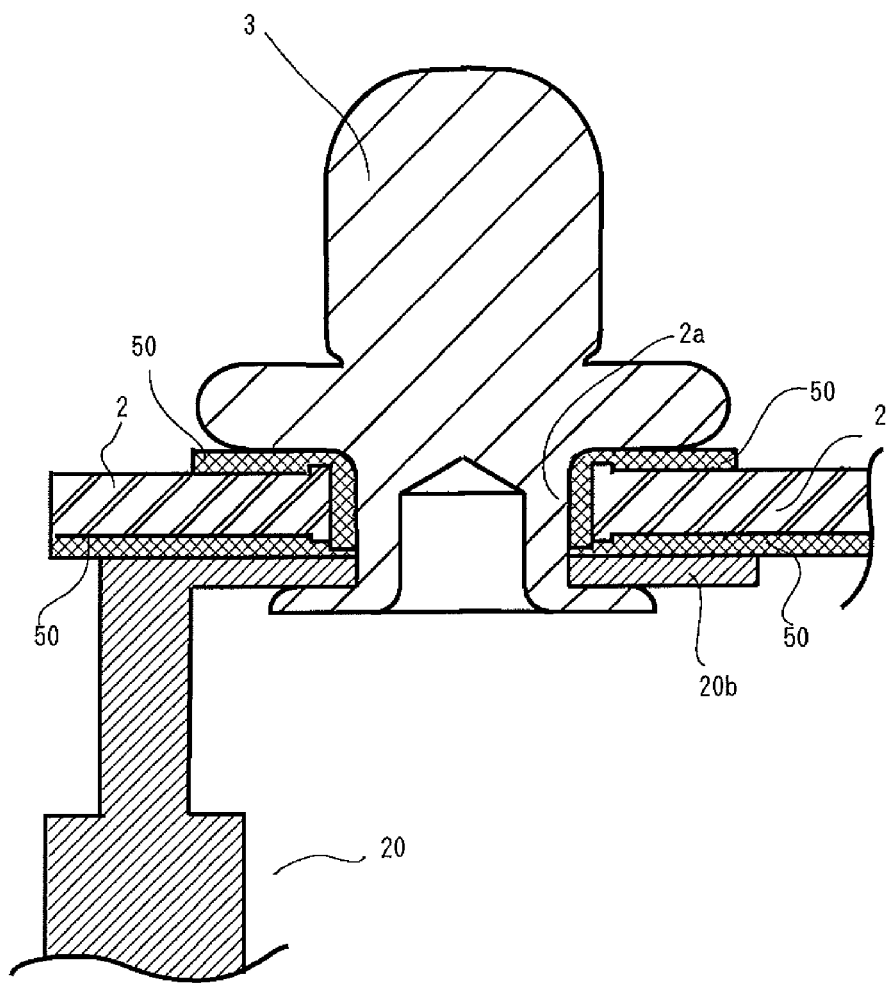
FIG. 7 shows a cross-sectional view of the structure where a current collector plate member according to Embodiment 1 is attached to an external output terminal and a sealing plate.

The positive electrode side is explained below. First, a current collector plate member 20 is connected to an external output terminal 3. FIG. 7 shows a structure of a current collector system around a sealing plate. As shown in FIG. 7, in the current collector system around the sealing plate, insulating members 50 are disposed between a lower surface of the sealing plate 2 and an external connection portion 20b of the current collector plate member 20, between an upper surface of the sealing plate 2 and a peripheral flange of the external output terminal 3, and around a through hole 2a formed in the sealing plate 2. Thereby, the sealing plate 2 is insulated from the current collector plate member 20 and the external output terminal 3.

An assembly process of the collector system around the sealing plate is as follows. The insulating member 50 is disposed at a predetermined portion of sealing plate 2. The external connection 20b is positioned on an inner surface (a surface for the insulating member 50) of the sealing plate 2 so that an attachment hole 20c is communicated with the through hole 2a of the sealing plate 2. Thereafter, the external output terminal 3 is inserted into the through hole 2a and the attachment hole 20c. Then, the external connection portion 20b of the current collector plate member 20 and the external output terminals 3 are caulked and fixed to the sealing plate 2 by expanding the diameter of the lower part of the external output terminal 3. Thereby, in addition to integration of each member, the external output terminal 3 is electrically connected to the current collector plate member 20.

The negative electrode system is fabricated in the similar way to the positive electrode system. The entire structure thus obtained in which the sealing plate 2, the external output terminal 3 and the current collector plate member are connected is referred to as an external output terminal side current collector structure.

Figure 8:
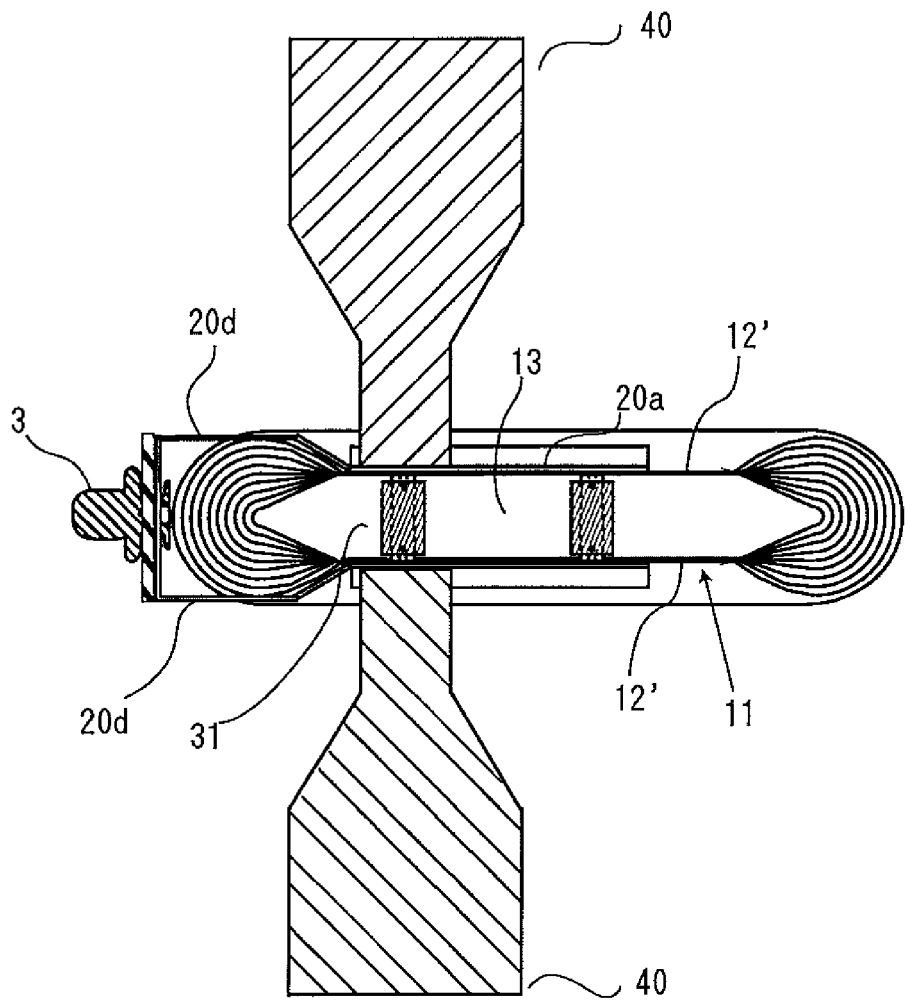
FIG. 8 shows an aspect in Embodiment 1, in which a columnar connection conductive member and a current collector plate member are resistance welded to a flat electrode assembly.

Next, there is explained a preparation process of a current collection system of the flat electrode assembly, i.e. a welding process of the flat electrode assembly with a current collector plate member and a connection conductive member. FIG. 8 is a cross-sectional schematic diagram showing a welding of the flat electrode assembly 10 with the current collector plate member 20 and the connection conductive member 30. As shown in FIG. 8, two reinforcing member-attached connection conductive members 31 are disposed in the boundary 13 between two divided flat electrode assemblies 10, and the members 31 are separated from each other.

In addition, the above-fabricated external output side terminal current collector structure is disposed so that core contact portions are contacted with both external surfaces of each of the core exposed portions 5b and 6b in the flat portion of the flat electrode assembly 10.

Thereafter, in the positive electrode system, welding electrode bars 40 are placed on the external surfaces of the core contact portion 20a as shown in FIG. 8. Then, the core exposed portion laminate 12 is vertically pressed at a pressure of 100 to 200 kg while current of 12 to 18 kA is simultaneously flowed to the relevant part for 13 to 15 ms. Thereby, the respective members are resistance welded. In both of the positive electrode system and the negative electrode system, the two connection conductive members are sequentially resistance welded to each of the core exposed portion laminates (12') in the above-mentioned way.

In the positive electrode system, the core exposed portion laminate 12 that is divided into two at the two-division boundary 13 is electrically connected to the reinforcing member-attached conductive member 31 using resistance welding. And the core exposed portion 5a is further connected to the core contact portion 20a of the current collector plate member 20. In addition, the current collector plate member 20 is connected to the external output terminal 3 via the external connection portion 20b. Thus, this resistance welding electrically connects one electrode (the positive electrode) of the flat electrode assembly to the external output terminal. The same applies to the negative electrode system.

Thereafter, the flat electrode assembly 10 is inserted into a prismatic cell case 1; the sealing plate 2 is fitted into the opening of the prismatic cell case 1; a joint between the prismatic cell case 1 and a circumference of the sealing plate 2 is laser welded; an electrolyte solution is injected from an electrolyte injection hole (not shown) provided on the sealing plate 2; and the electrolyte injection hole is sealed. Thus, the prismatic lithium ion secondary cell according to Embodiment 1 is completed.

Figure 9:
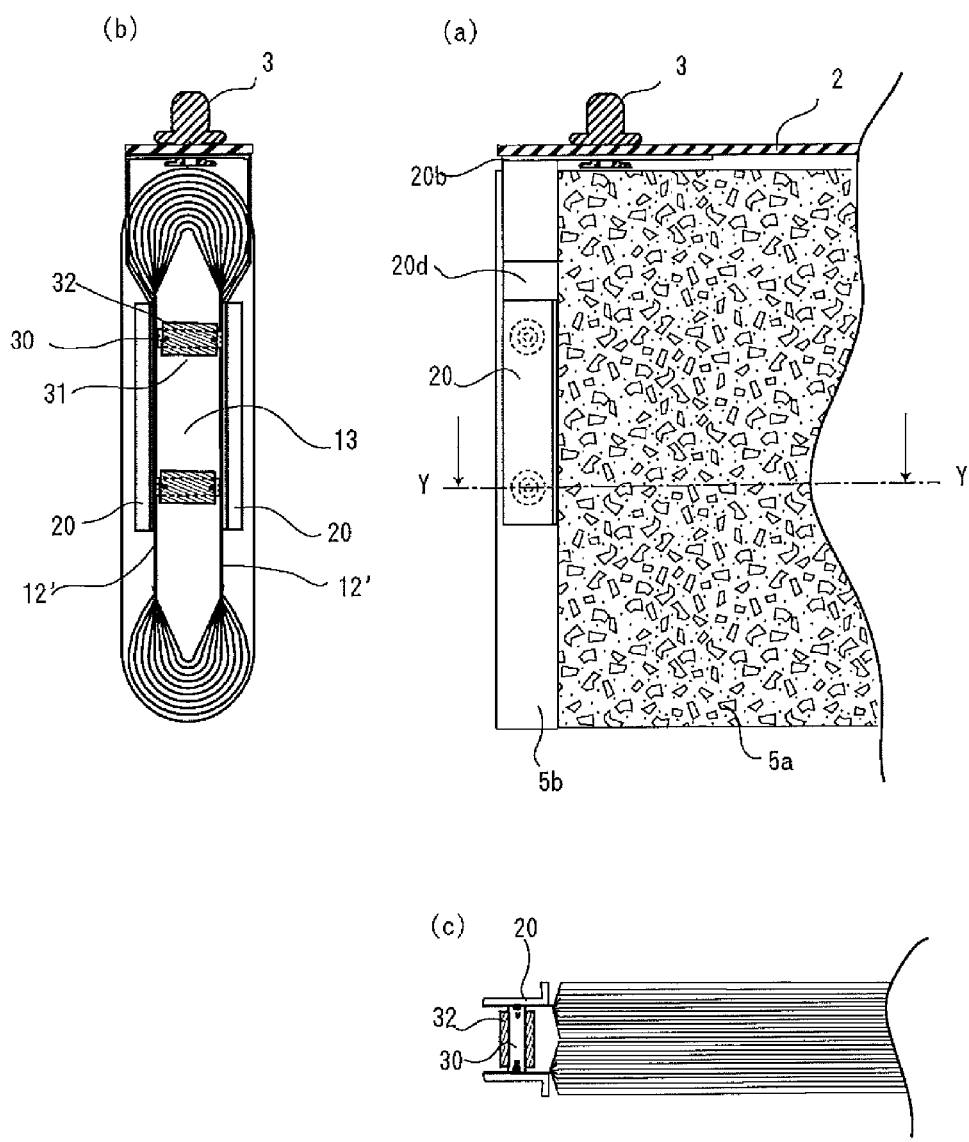
FIG. 9 is a diagram showing a flat electrode assembly to which each member of a current collector system according to Embodiment 1 is attached. (a) is a front view, (b) is a side view, and (c) is a cross section along Y-Y.

FIG. 9 is a cross-sectional schematic diagram showing the internal structure of the lithium ion secondary cell according to Embodiment 1. FIG. 9(a) is transparent front view of the inside of the prismatic cell case from the direction of the arrow X in FIG. 1. FIG. 9(b) is the left side view of FIG. 9(a), and FIG. 9(c) shows a cross section along the Y-Y line in FIG. 9(a). In this lithium ion secondary cell, the core exposed portion laminate is divided into two laminates. And the two-divided core exposed portion laminates 12', 12' are electrically connected via the two columnar connection members disposed therebetween. In addition, the current collector plate (the core contact portion 20a of the current collector plate member) is attached on the outermost surface of each of the two-divided core exposed portion laminates 12', 12'.

In Embodiment 1, adoption of such a current collector structure realizes a prismatic sealed secondary cell that is applicable to high output, and characterize in that the current collection property is less likely to deteriorate over time, a current collection resistance is significantly small, and its reliability is excellent.

Other Embodiments

<1> Connection Conductive Member and a Resin Reinforcing Member

In Embodiment 1, there is used a reinforcing member-attached connection conductive member 31 whose circumference is covered by the resin reinforcing member. However, a columnar connection conductive member 30 without the resin reinforcing member 32 may be used alone.

Figure 10:
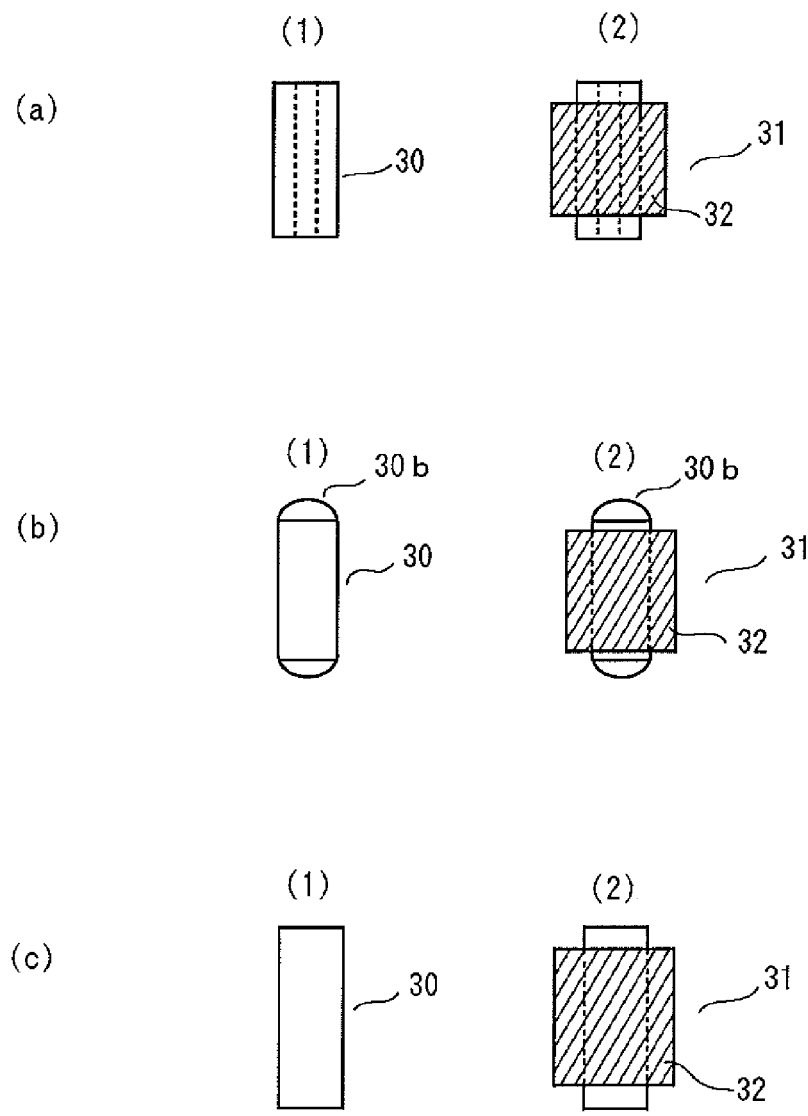
FIG. 10 shows a diagram illustrating connection conductive members and reinforcing member-attached connection members according to other embodiments.

Moreover, instead of the columnar connection conductive member having the recesses 30a at both ends thereof, columnar connected conductive members shown in FIGS. 10(a) to (c) may be used alone. FIG. 10(a) shows a columnar connection conductive member having a hollow axis; FIG. 10(b) shows a columnar connection conductive member having convex curved ends; and FIG. 10(c) shows a columnar connection conductive member having flat ends.

In addition, when a resin reinforcing members is arranged around a variety of columnar connection conductive members shown in FIGS. 10(a) to (c), they can also be used as a reinforcing member-attached columnar connection conductive members ((2) of FIGS. 10(a) to (c)).

The columnar connection conductive member has only to be columnar, regardless of the shape of the cross section (the cross section perpendicular to the axis). Therefore, its cross section may be polygonal, elliptical and other irregular shapes, instead of a circle.

The cross-sectional shape of the resin reinforcing member is not also limited. The resin reinforcing member does not need to completely cover the entire circumference of the columnar connection conductive member. Therefore, a reinforcing member partly having a cutout (e.g. a cutout along the axial direction) may be used.

<2> Current Collector Plate

Figure 11:
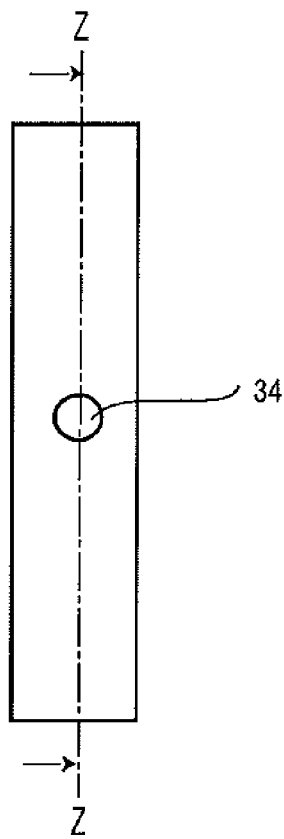
FIG. 11 is a diagram illustrating a current collector plate in another embodiment. (a) is a front view, and (b) is a cross section along the Z-Z in (a).
Figure 11:
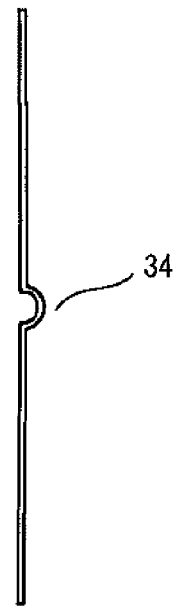
Figure 12:
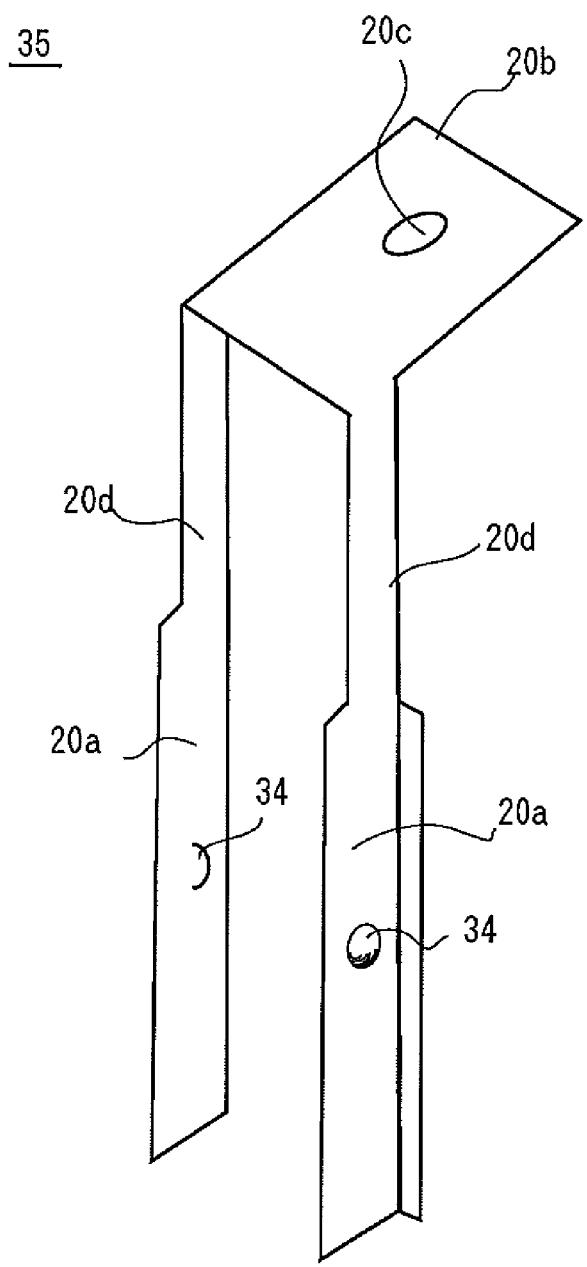
FIG. 12 shows a perspective view showing a current collector plate member according to another embodiment.

In Embodiment 1, the current collector plate member as shown in FIG. 4 is used. However, as stated above, another type current collector plate member may be used. For example, as shown in FIG. 11, there may be used a current collector plate 33 having a protrusion 34 projecting outward at the center. Such a protrusion 34 may be formed on the core contact portion 20a of the current collector plate member 20. FIG. 12 shows a current collector plate member 35 having a protrusion 34.

In an embodiment using the current collector plate or current collector plate member on which the protrusion (projection) is formed, it is necessary to position the protrusion on the extension of the axis of the columnar connection conductive member. Under this situation, when the current collector plate is pressed by an electrode bar for welding, the core exposed portion laminate and the ends of the columnar connection conductive member are pressed each other at a pinpoint area. Therefore, excellent pinpoint resistance welding can be performed.

In the case of a combination of the current collector plate having a protrusion with a columnar connection conductive member whose ends have a recess, since the recess of the columnar connection conductive member is fitted to the protrusion of the current collector plate, the columnar connection conductive member can be easily fixed and thus the workability of welding is improved.

In Embodiment 1 described above, a pair of the current collector plate members are placed on both outer surfaces of the core exposed portion in the flat portion, and each of the current collector plate members is connected to the external output terminal. However, only one of the current collector plates may be connected to the external output terminal. For example, one of the current collector plates may be used only as a welding receiving member, while the other current collector plate may be connected to the external output terminal.

<3> The Number of the Used Columnar Connection Conductive Members

Figure 13:
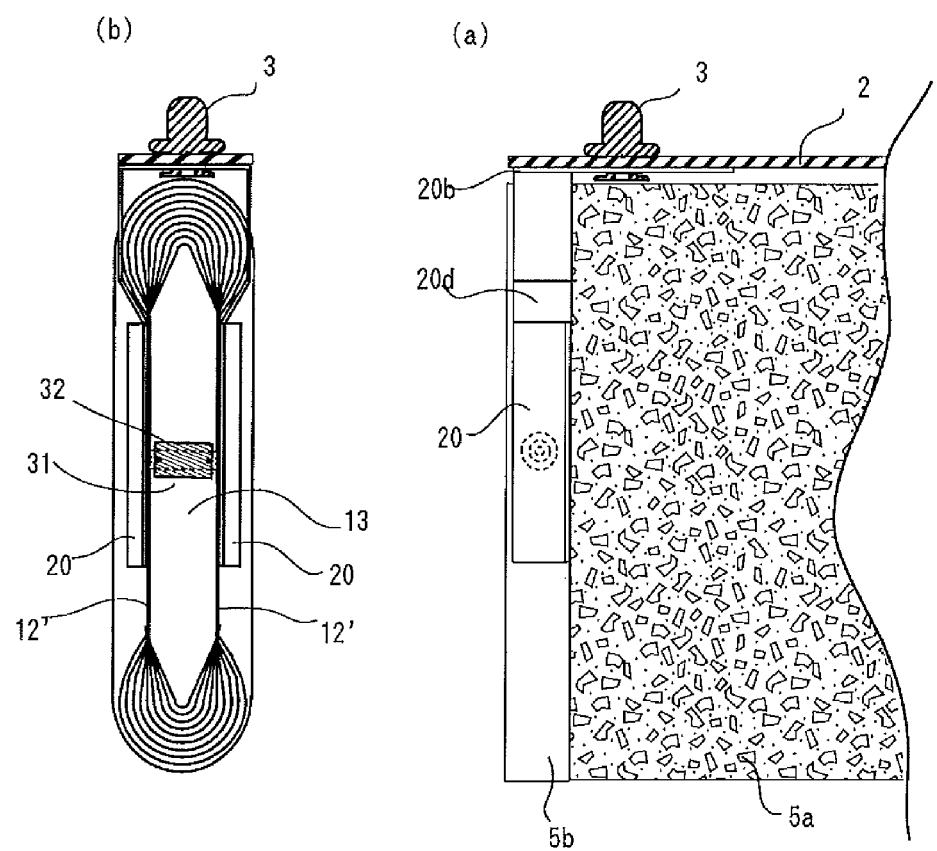
FIG. 13 is a diagram showing the internal structure of cells according to another embodiment using one columnar connection conductive member.

In Embodiment 1 described above, two reinforcing member-attached connection conductive members are disposed in the division boundary of the spiral flat electrode assembly. However, the number of the used columnar connection conductive members may be one as shown in FIG. 13, or may be three or more.

Embodiment 1 shows an example of the spiral flat electrode assembly, but the present invention can also be applied to a laminate type.

Embodiment 1 shows an example in which the current collector system structure according to the present invention is adopted to both positive and negative electrode plates (both ends of the flat electrode assembly). However, even when the current collector system structure according to the present invention is adopted to only one of the positive and negative electrode plates, a certain effect can be obtained.

Furthermore, an example of a lithium ion secondary cell is shown in Embodiment 1, but the present invention is not limited to the lithium ion secondary cell. For example, the present invention can be applied to prismatic sealed secondary cells such as nickel-hydride and nickel-cadmium cells.

According to the present invention, it is possible to provide a prismatic sealed secondary cell that is excellent in current collection efficiency and current collection stability, and capable of high output discharge without a significant increase in cost. Thus the availability of the industry is significant.

DESCRIPTION OF THE NUMERAL REFERENCES

1 Prismatic cell case
2 Sealing plate
2a Sealing plate through hole
3 Positive electrode external output terminal
4 Negative electrode external output terminal
5 Positive electrode plate
5a Positive electrode active material layer
5b Positive electrode core exposed portion
6 Negative electrode plate
6a Negative electrode active material layer
6b Negative electrode core exposed portion
10 Flat electrode assembly
11 Flat portion
12 Positive electrode core exposed portion laminate
12' Divided positive electrode core exposed portion laminate
13 Two-division boundary
20 Current collector plate member
20a Core contact portion
20b External connection portion
20c Attachment hole
20d Lead portion
30 Columnar connection conductive member
30a Recess
31 Reinforcing member-attached connection conductive member
32 Resin reinforcing member
33 Current collector plate with a protrusion
34 Protrusion
35 Current collector plate member with a protrusion
40 Welding electrode bar
50 Insulating member

What is claimed is:

1. A prismatic sealed secondary cell comprising:
a flat electrode assembly in which a first electrode plate and a second electrode plate having a different polarity from that of the first electrode plate, both of which respectively have a core exposed portion at one edge thereof in the width direction, are laminated or spirally wound with a separator interposed therebetween so that the respective core exposed portions may point in the laterally opposite directions;
a current collector plate member joined to the first electrode plate;
an external output terminal electrically connected to the first electrode plate via the current collector plate member; and
a prismatic cell case housing the flat electrode assembly, wherein
the current collector plate member comprises a pair of current collector plates,
the pair of current collector plates are disposed on a flat portion in the outermost surface of the core exposed portion of the first electrode plate constituting the flat electrode assembly so that the pair of current collector plates sandwich the flat portion in the thickness direction,
a columnar connection conductive member is interposed between two-divided core exposed portion laminates in the flat portion sandwiched between the pair of current collector plates,
the pair of current collector plates, the columnar connection conductive member and the two-divided core exposed portion laminates are welded to each other,
one of the pair of current collector plates is not connected with the other of the pair of current collector plates on an end side of the flat electrode assembly to which the core exposed portion of the first electrode protrudes, and
a circumference of the columnar conductive member is covered with a resin reinforcing member.

2. The prismatic sealed secondary cell according to claim 1, wherein a protrusion that is faced to the end of the columnar connection conductive member is formed on a surface of each of the pair of current collector plates.

3. The prismatic sealed secondary cell according to claim 1, wherein the flat electrode assembly is a spiral flat electrode assembly formed by flattening a spiral electrode assembly in which the first electrode plate and the second electrode plate are wound via the separator.

4. The prismatic sealed secondary cell according to claim 1, wherein
the prismatic cell case comprises an opening and a bottom,
the prismatic sealed secondary cell further comprises a sealing member for sealing the opening,
the current collector plate member comprises a first region positioned between the flat electrode assembly and the sealing member, a second region extending from one end of the first region toward the bottom of the prismatic cell case, and a third region extending from the other end of the first region to the bottom of the prismatic cell case, and
the second region comprises the one of the pair of current collector plates and the third region comprises the other of the pair of current collector plates.

5. The prismatic sealed secondary cell according to claim 4, wherein the current collector plate member comprising the first region, the second region and the third region is consisted of one part.

6. A method for producing a prismatic sealed secondary cell comprising at least:
a flat electrode assembly in which a first electrode plate and a second electrode plate having a different polarity from that of the first electrode plate, both of which respectively have a core exposed portion at one edge thereof in the width direction, are laminated or spirally wound with a separator interposed therebetween so that the respective core exposed portions may point in the laterally opposite directions;
a current collector plate member that is joined to the first electrode plate and comprises a pair of current collector plates;
an external output terminal electrically connected to the first electrode plate via the current collector plate member; and
a prismatic cell case housing the flat electrode assembly, wherein
the method comprises:
a first step of dividing a flat portion of a core exposed portion laminate formed by laminating the core exposed portion of the first electrode plate into two parts in the thickness direction, and of interposing therebetween a columnar connection conductive member whose circumference is covered with a resin reinforcing member;

a second step of disposing the pair of current collector plates on both outermost surfaces of the flat portion of the core exposed portion laminate formed by laminating the core exposed portion of the first electrode plate; and a third step of contacting resistance welding rods on each of the pair of the current collector plates with the columnar connection conductive member interposed after completing the first and second steps, and of welding the pair of current collector plates, the columnar connection conductive member and the two-divided core exposed portion laminates due to voltage application.

7. The method for producing the prismatic sealed secondary cell according to claim 6, wherein a member whose both ends are recessed is used as the columnar connection conductive member.

8. The method for producing the prismatic sealed secondary cell according to claim 7, wherein a protrusion that is opposite to the end of the columnar connection conductive member is formed on a surface of each of the pair of current collector plates.

9. The method for producing the prismatic sealed secondary cell according to claim 6, wherein, as the flat electrode assembly, there is used a spiral flat electrode assembly formed by flattening a spiral electrode assembly in which the first electrode plate and the second electrode plate are wound via the separator.

10. The method for producing the prismatic sealed secondary cell according to claim 6, wherein a tubular member is used as the columnar connection conductive member.

11. The method for producing the prismatic sealed secondary cell according to claim 6, wherein a member whose both ends have a convex curve is used as the columnar connection conductive member.

12. The method for producing a prismatic sealed secondary cell according to claim 6, wherein one of the pair of current collector plates is not connected with the other of the pair of current collector plates on an end side of the flat electrode assembly to which the core exposed portion of the first electrode protrudes.

13. The method for producing a prismatic sealed secondary cell according to claim 12, wherein the prismatic cell case comprises an opening and a bottom, the prismatic sealed secondary cell further comprises a sealing member for sealing the opening, the current collector plate member comprises a first region positioned between the flat electrode assembly and the sealing member, a second region extending from one end of the first region toward the bottom of the prismatic cell case, and a third region extending from the other end of the first region to the bottom of the prismatic cell case, and the second region comprises the one of the pair of current collector plates and the third region comprises the other of the pair of current collector plates.

14. The method for producing a prismatic sealed secondary cell according to claim 13, wherein the current collector plate member comprising the first region, the second region and the third region is consisted of one part.

* * * * *